(12) United States Patent
Ershov (10) Patent No.: US 6,320,663 B1
(45) Date of Patent: Nov. 20, 2001

(54) METHOD AND DEVICE FOR SPECTRAL MEASUREMENTS OF LASER BEAM

(75) Inventor: Alexander I. Ershov, San Diego, CA (US)

(73) Assignee: Cymer, Inc., San Diego, CA (US)

(*) Notice: Subject to any disclaimer, the term of this patent is extended or adjusted under 35 U.S.C. 154(b) by 0 days.

(21) Appl. No.: 09/513,324

(22) Filed: Feb. 25, 2000

Related U.S. Application Data (63) Continuation-in-part of application No. 09/245,134, filed on Feb. 4, 1999, now Pat. No. 6,243,170, and a continuation-in-part of application No. 09/236,148, filed on Jan. 22, 1999, now Pat. No. 6,061,129.

(51) Int. Cl.$^7$ .......................................... G01B 9/02
(52) U.S. Cl. ............................................. 356/454; 372/32
(58) Field of Search ............................. 356/454; 372/29, 372/32

(56) References Cited

U.S. PATENT DOCUMENTS

| | | | |
|---|---|---|---|
| 3,729,261 | 4/1973 | Sandercock | 356/112 |
| 4,005,937 | 2/1977 | Barrett | 356/106 |
| 4,076,422 | 2/1978 | Kohno | 356/106 |
| 4,850,709 | 7/1989 | Ban et al. | 356/352 |
| 4,856,899 * | 8/1989 | Iwaoka et al. | 356/346 |
| 5,025,445 | 6/1991 | Anderson et al. | 372/20 |
| 5,243,614 | 9/1993 | Wakata et al. | 372/29 |
| 5,285,255 | 2/1994 | Baranne et al. | 356/328 |
| 5,450,207 | 9/1995 | Fomenkov | 356/416 |
| 5,589,717 | 12/1996 | Chau | 356/328 |
| 5,757,483 | 5/1998 | Pierce, III | 356/305 |
| 5,835,210 | 11/1998 | Ershov | 356/328 |
| 5,991,324 | 11/1999 | Knowles et al. | 372/57 |

FOREIGN PATENT DOCUMENTS

| | | |
|---|---|---|
| 62-203024 | 9/1987 | (JP). |
| 3-173486 | 7/1991 | (JP). |
| 5-007031 | 1/1993 | (JP). |
| 10-300587 | 11/1998 | (JP). |

OTHER PUBLICATIONS

H. Tsuda, T. Yoshizawa and T. Kurokawa, "Polarisation independent tunable liquid-crystal Fabry-Perot interferometer filter module with double-pass configuration", Electronic Letters, vol. 31, No. 10, May 11, 1995.

* cited by examiner

Primary Examiner—Frank G. Font
Assistant Examiner—Phil Natividad
(74) Attorney, Agent, or Firm—John R. Ross, Esq.

(57) ABSTRACT

A fast response etalon based spectrometer for spectral measurement of a pulse laser beam. A portion of the beam is directed through a double pass etalon device which provides angular separation of spectral components of the beam. The spectral components are measured by a fast photodiode array. In a preferred embodiment periodic photodiode data is also collected between pulses to record background dark current values for each photodiode in the array. In a preferred embodiment at least one set of dark current data is collected for each set of laser spectral data embodiments and the dark current data are subtracted from the laser spectral data to provide corrected spectral data at rates of up to 2000 Hz or greater. The spectrometer is very compact producing precise fringe data permitting bandwidth measurements with precision needed for microlithography for both $\Delta\lambda_{FWHM}$ and $\Delta\lambda_{95}\%$.

16 Claims, 11 Drawing Sheets

METHOD AND DEVICE FOR SPECTRAL MEASUREMENTS OF LASER BEAM

This application is a continuation-in-part of U.S. Ser. No. 09/236,148, filed Jan. 22, 1999, now U.S. Pat. No. 6,061,129 entitled "Compact High Resolution Spectrometer" and U.S. Ser. No. 09/245,134, filed Feb. 4, 1999, now U.S. Pat. No. 6,243,170 entitled "Double Pass Etalon Spectrometer". This invention relates to optical devices and especially to spectrometers.

BACKGROUND OF THE INVENTION

Specrometers are well known devices for measuring the intensity of light in a laser beam as a function of wavelengths. Spectrometers used to measure the spectrum of the excimer laser can be divided into two main categories diffraction grating based spectrometers and Fabri-Perot etalon based spectromters.

Figure 1:
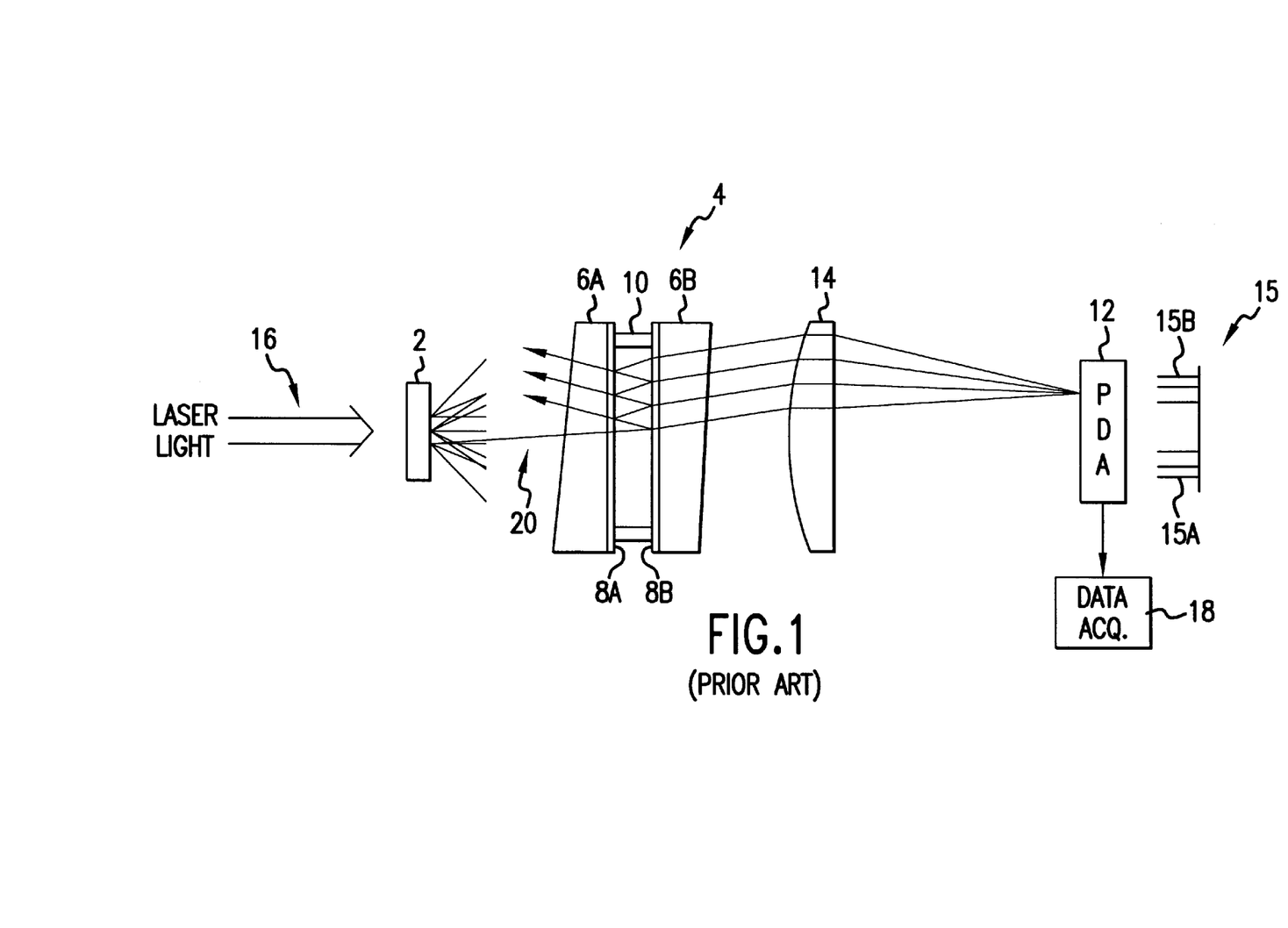
FIG. 1 is a drawing of a prior art spectrometer.

FIG. 1 shows the features of a prior art etalon spectrometer used for measurement of wavelength and bandwidth of a laser beam 16. The beam is diffused by diffuser 2 so that rays propagating in a very large number of angles illuminate etalon 4. FIG. 1 shows a single ray 20 being reflected many times within the etalon gap between surfaces 8A and 8B which are coated to reflect about 90% of the light. Spectral components which are transmitted through the etalon are focused by lens 14 onto photo diode array 12. Photo diode array 12 registers a fringe pattern 15 which can be read using electronic data acquisition board 18. The transmission or reflection of light incident on an etalon such as that depicted is well understood and depends on the design of the etalon, particularly the reflectance of the two reflecting surfaces.

A particularly important use of etalon spectrometers is to measure the bandwidth of line narrowed excimer lasers such as the line narrowed KrF or ArF excimer lasers. These lasers are used, for example, as light sources for deep-UV microlithography.

A description of a KrF laser is provided in U.S. Pat. No. 5,991,324 which is incorporated herein by reference.

There are two spectral characteristics of these lasers which are very important for microlithography applications. These are the spectral bandwidth of the laser measured at 50 percent of the peak intensity, called its full width at half maximum bandwidth (abbreviated $\Delta\lambda_{FWHM}$), and the spectral bandwidth, which contains 95% of laser energy called the 95% integral bandwidth (abbreviated $\Delta\lambda_{95}\%$). It is very important that the laser is always operating within specifications during microlithography chip manufacturing because spectral broadening would cause blurring of the integrated circuit features being printed on silicon wafers which will result in yield problems. Therefore, it is very important to provide continuous monitoring capabilities for the laser spectrum.

The prior art etalon spectrometer is capable of accurately measuring $\Delta\lambda_{FWHM}$ values, and is currently used for this purpose in production microlithography lasers, such as manufactured by CYMER, Inc. (San Diego, Calif.). However, prior art etalon spectrometers are not very suitable for accurately measuring $\Delta\lambda_{95}\%$ values. Typical production quality KrF excimer lasers should have a $\Delta\lambda_{FWHM}$ of about 0.6 pm and $\Delta\lambda_{95}\%$ of about 2 pm, if operating properly.

Figure 2:
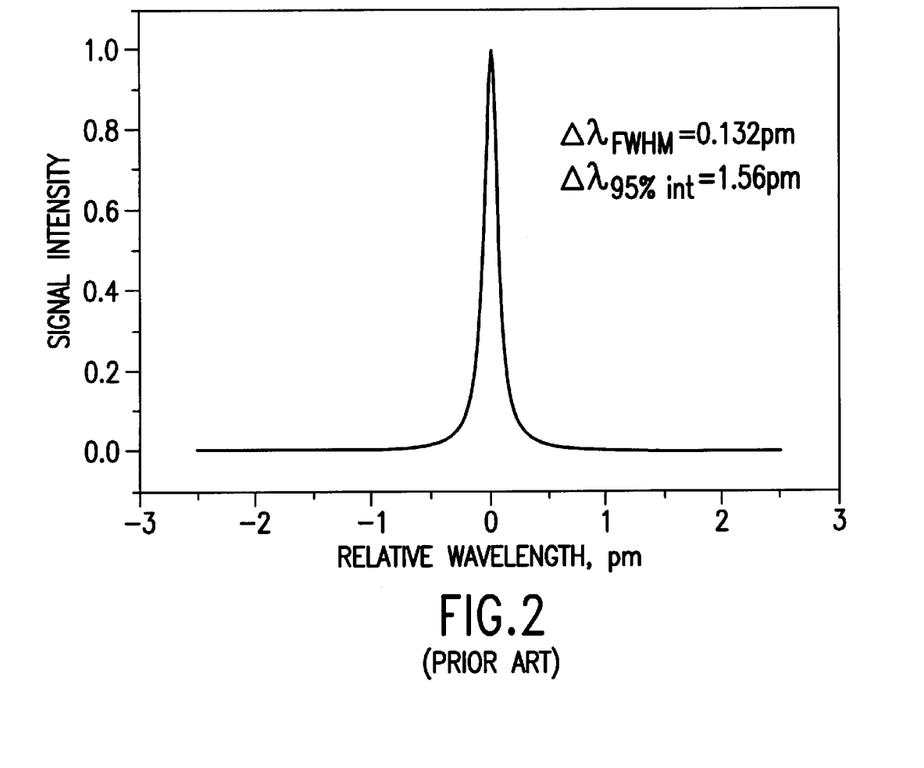
FIG. 2 is a graph of the slit function of a prior art etalon spectrometer.

FIG. 2 shows the calculated so called "slit function" spectrum of a typical prior art etalon having a free spectral range (FSR) of 5 pm and a coefficient of finesse (finesse) of 38. (The terms FSR and finesse are defined and explained in a variety of optic texts such as OPTICS by Eugene Hecht/ Alfred Zajae published by Addison-Wesley, Reading, Mass.) The slit function spectrum of FIG. 2 can be derived from one of the peaks of fringe pattern 15. The calculation graphed in FIG. 2 assumes that the light illuminating the etalon is monochomatic (i.e., an infinitely narrow bandwidth). If such an etalon is used to measure the bandwidth of a laser beam, the slit function bandwidth of the etalon is a source of error and contributes to uncertainty or error in the measurement. The calculated FWHM bandwidth for this prior art etalon is 0.13 pm and the 95% integral bandwidth for the etalon is about 1.5 pm.

For the etalon to accurately measure spectrum of a real laser, the slit function bandwidth of the etalon itself should be substantially smaller than the laser bandwidth. While this condition is satisfied for $\Delta\lambda_{FWHM}$ measurements, where etalon slit function FWHM of 0.13 pm is substantially smaller than typical laser $\Delta\lambda_{FWHM}$ of about 0.6 pm, the same is not true for $\Delta\lambda_{95}\%$ measurements, where etalon slit function bandwidth of about 1.5 pm is a substantial fraction of the expected laser bandwidth of about 2 pm.

Therefore, if the prior art etalon spectrometer with the FIG. 2 slit function is used to measure $\Delta\lambda_{95}\%$, a complicated numerical analysis is needed to deconvolve the real $\Delta\lambda_{95}\%$ value. Such analysis is prone to errors and ambiguous results, so no reliable $\Delta\lambda_{95}\%$ information is available during the microlithography process. As a result, a laser can go out of specification unnoticed. This can lead to very expensive yield problems and should be avoided.

Another way of accurately measuring laser spectrum is to use a high resolution grating spectrometers. These instruments can provide accurate spectral measurement including accurate $\Delta\lambda_{95}\%$ measurements, but are very bulky and expensive. These instruments are successfully used in the laboratory but are not well suited for production line microlithography use.

Another problem which needs to be solved is connected with the use of photodiode array to measure the light intensity distribution at the exit of spectrometer. Although photodiode arrays (PDA's) allow a "snap shot" of complete spectrum to be made in a single laser pulse, they do have a problem which is especially important for $\Delta\lambda_{95}\%$ measurements. A PDA has significant noise which is usually referred to as a "dark current" noise. This noise adds to the signal being measured, thus reducing the accuracy of measurements. The noise amplitude might be up to a few percent of maximum of the measured signal, so for the FWHM measurement it is usually not a big problem. However, it becomes a very significant problem in $\Delta\lambda_{95}\%$ measurements, which are very sensitive to small signal levels at the tails of the spectrum.

Currently, two methods are used to reduce the effect of dark current noise. According to the first method, few pixels on a PDA are shielded from the light coming from spectrometer. The signal from these pixels is read at the same time as the signal from the rest of the PDA and is used as a dark current reference. The problem with this method is that the dark current is assumed to be the same for all pixels, while in practice it is not. Experiments done by Applicant show that this dark current can vary by as much as two times on some PDA's. Accordingly to the second method, a PDA scan is done when the light is blocked from illuminating the PDA. The signal from every pixel is read and saved to be used as a dark current reference later when the spectral measurements are done. This technique allows individual dark current correction for every pixel. The problem, however, is that dark current noise can change over time. In fact, this noise can change significantly in just a few minutes. This requires frequent dark current calibration measurements. Even though this can be done in the laboratory, it is very difficult to do in a microlithography production environment.

What is needed is a compact spectrometer, capable of accurate measurement of both $\Delta\lambda_{FWHM}$ and $\Delta\lambda_{95}\%$ which can be built as a part of internal electric discharge laser diagnostic set, so that it can be used in the field during the microlithography process.

SUMMARY OF THE INVENTION

The present invention provides a fast response etalon based spectrometer for spectral measurement of a pulse laser beam. A portion of the beam is directed through a double pass etalon device which provides angular separation of spectral components of the beam. The spectral components are measured by a fast photodiode array. In a preferred embodiment periodic photodiode data is also collected between pulses to record background dark current values for each photodiode in the array. In a preferred embodiment at least one set of dark current data is collected for each set of laser spectral data embodiments and the dark current data are subtracted from the laser spectral data to provide corrected spectral data at rates of up to 2000 Hz or greater. The spectrometer is very compact producing precise fringe data permitting bandwidth measurements with precision needed for microlithography for both $\Delta\lambda_{FWHM}$ and $\Delta\lambda_{95}\%$.

DETAILED DESCRIPTION OF PREFERRED EMBODIMENTS

Double Pass Etalon

Figure 3:
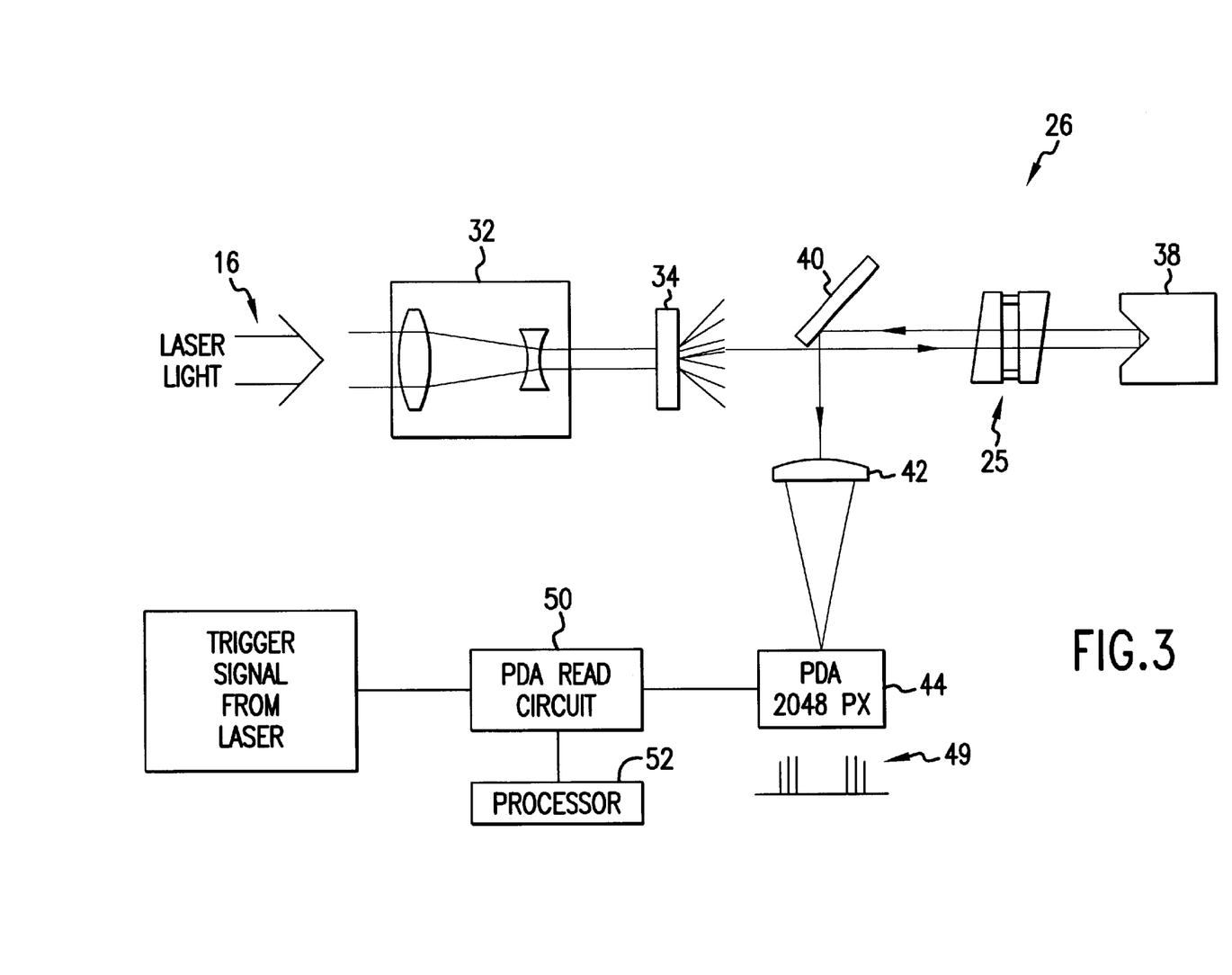
FIGS. 3 and 3A are drawings of a first embodiment of the present invention.

FIG. 3 shows a preferred embodiment of the present invention. A laser beam 16 has its size reduced three times using telescope 32 and illuminates diffuser 34. Light scattered from diffuser 34 illuminates double pass etalon assembly 26. Hollow retro-reflector 38 is used to return the beam back to etalon 25 for a second pass. Each component of the beam is reflected at exactly or almost exactly 180-degrees for the second pass through etalon 25 but there are small displacements of the reflected components. These small displacement permit the use of a 45-degree mirror 40 which reflects beam components after double-passes through the etalon, but allows passage of a sufficient portion of the incoming beam. The reflected beam components are focused by lens 42 with a one-meter focal length onto linear photo diode array (PDA) 44, where a fringe pattern 49 is detected. A preferred PDA is a 2048 element, $14\mu \times 14\mu$ array Model RL2048PAQ available from EG&G, Inc., Sunnyvale, Calif.

The present invention, by correcting the data from each pixel using dark current data from the preceding PDA cycle for the same pixels greatly improves the quality of the spectral measurements as compared to the two prior art techniques discussed in the Background section for correcting/or "background" or "dark current" noise.

The fringe pattern 49 as shown in FIG. 3 consists of multiple peaks located in the same position as the peaks 15 of prior art etalon of FIG. 1. The difference though is that the peaks of the etalon of the present invention more closely match the actual laser spectrum because of improved resolution of etalon spectrometer in this double pass configuration and improved noise reduction.

Figure 5:
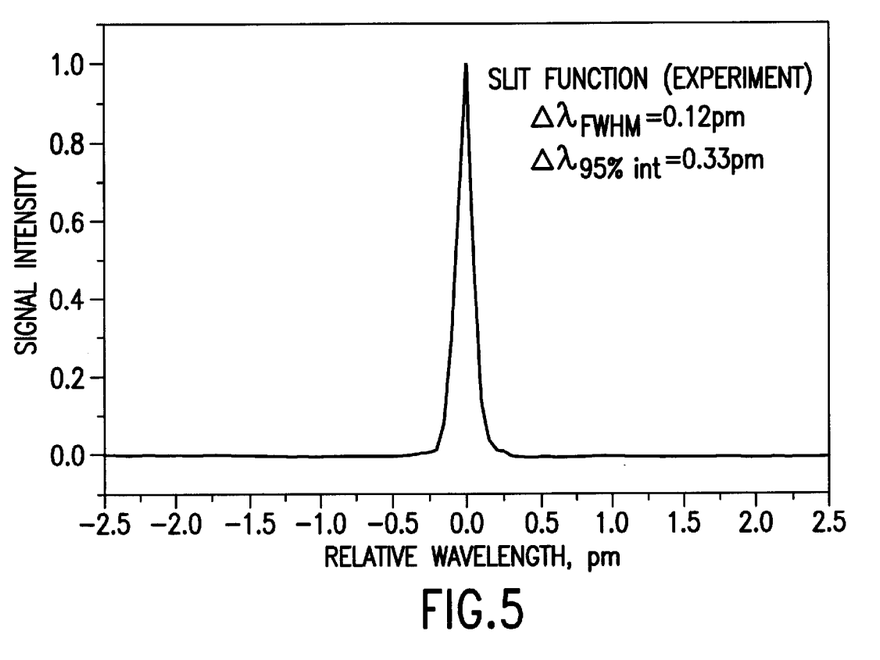
FIG. 5 shows results of spectral measurements of ultranarrow frequency doubled CW Ar-ion laser at 248.25 nm.

FIG. 5 shows a spectrum (recorded with PDA 44) of the beam from a frequency doubled Ar-ion cw laser which emits light at 248,250 pm with an extremely narrow spectral bandwidth of only about 0.003 pm (FWHM). (The light spectrum from this laser is narrow enough to be considered monochomatic for purposes of testing etalons with bandwidths in the ranges greater than 0.1 pm.) The FWHM bandwidth recorded by PDA 44 (as shown in FIG. 3) was about 0.12 pm with a 95 percent integral value of 0.33 pm. The theoretical values for two perfect etalons in series under the above conditions would be 0.09 pm (FWHM and 0.25 (95% integral). These results show that bandwidth resolutions in the range of 0.1 pm for FWHM and about 0.3 for the 95% integral are obtainable with the FIG. 3 double pass etalon spectrometer.

Fast Photodiode Array

The photodiode array referred to above is very fast. Its readout rate is about 20 megaHertz. It can measure light intensities at each of its 2048 pixels at rates of almost 10 KHz. In a preferred embodiment when the laser is being operated at a pulse rate of 2000 Hz, the photodiode array is recording data at a rate of 5000 Hz. The operation of the photodiode array is as follows:

1) Light photons illuminating the surface of each pixel knocks off electrons which are collected on a first very tiny capacitor.
2) Upon receiving a trigger signal the charge of the capacitor of each pixel is transferred in parallel to a corresponding second very tiny capacitor in a buffer line then the first capacitor is grounded to zero it and then the ground is removed. During this phase the pixels are in effect "turned off" so that they are not measuring light intensity. However, the time required for the transfer of the charge information and the resetting of the pixels is very short, about ½ microsecond. Once the ground is removed, the pixels are again active and are accumulating charge approximately in proportion to light intensity.

Thus, when the array is operating at 5000 Hz, the pixels are "on" for time periods of about 199.5 microseconds and "off" for periods of about 0.5 microsecond. After the transfer of the pixel charges to the buffer line and during the next "on" period for the array, the buffer line is read out serially at a rate of about 10 megaHertz by PDA read circuit 50 in an operation which takes a little longer than 200 microseconds. This operation does not interfere with the collecting of charge during the "on" period. Processor 52 requires about 350 microseconds to calculate the wavelength and bandwidth of the laser using the pixel data.

Catching the Pulse

The laser of a typical lithography laser is about 40 nanoseconds long. Therefore, it is not possible that the pulse could overlap two "on" periods. For this reason, the PDA could be set to record data at 5000 Hz without any synchronization with the laser which is pulsing at 2000 Hz. Processor 52 could easily be programmed to determine which one of each three successive pulses contained the laser pulse and to use the preceding PDA data for the background signals for correcting the pulse data.

Figure 3A:
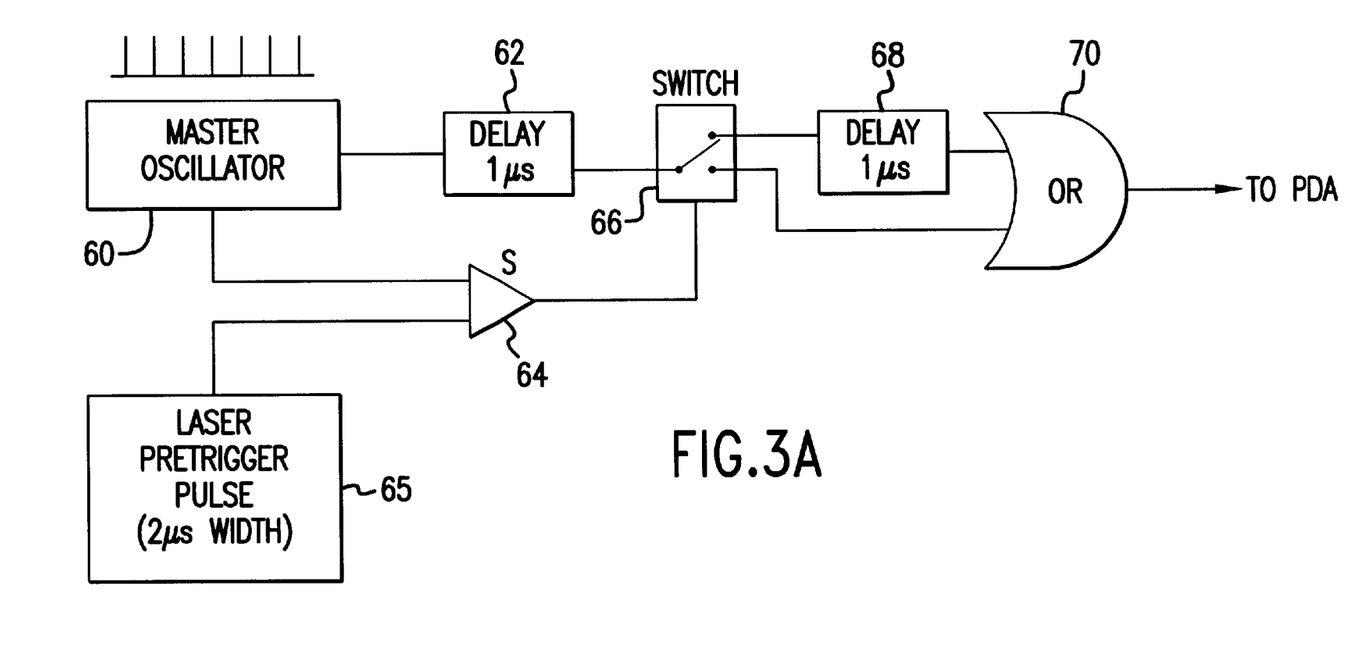

A preferred approach is to provide trigger signals to the PDA to assure that the laser pulse is not coincident with the transfer of pixel charge to the buffer line when the PDA will be "off" which would mean that the pulse data would not be recorded. A simple circuit for doing this is shown in FIG. 3A. Master oscillator 60 provides trigger pulses at 5 KHz (about 200 $\mu$s intervals). Delay circuit 62 adds a 1 $\mu$s delay to each trigger pulse. Each trigger pulse from master oscillator 60 is also compared in comparator 64 to a laser pretrigger pulse 65 from the pulse power supply from the laser. This pretrigger pulse occurs about 1 $\mu$s prior to the beginning of each laser pulse and is about 1 $\mu$s wide. (The laser pulse, remember, is only about 40 ns wide.) If the trigger pulse from master oscillator 60 overlap in time with the laser pretrigger pulse, the output of comparator circuit 64 causes switch 66 to operate adding an additional 1 $\mu$s delay provided by delay circuit 68 to the trigger signal. Thus, either a one $\mu$s delayed trigger signal or a two its delayed trigger signal operates "OR" circuit 70 which provides the trigger signal to trigger the transfer of charge from the PDA pixels to the buffer and to reset the pixels. Thus, if the pretrigger pulse from the laser comes at about the same time as the PDA trigger from its master oscillator, the "ON" period for each pixel is extended an extra microsecond to be sure that the pixels are "ON" when the pulse occurs.

Time Budget

Figure 4:
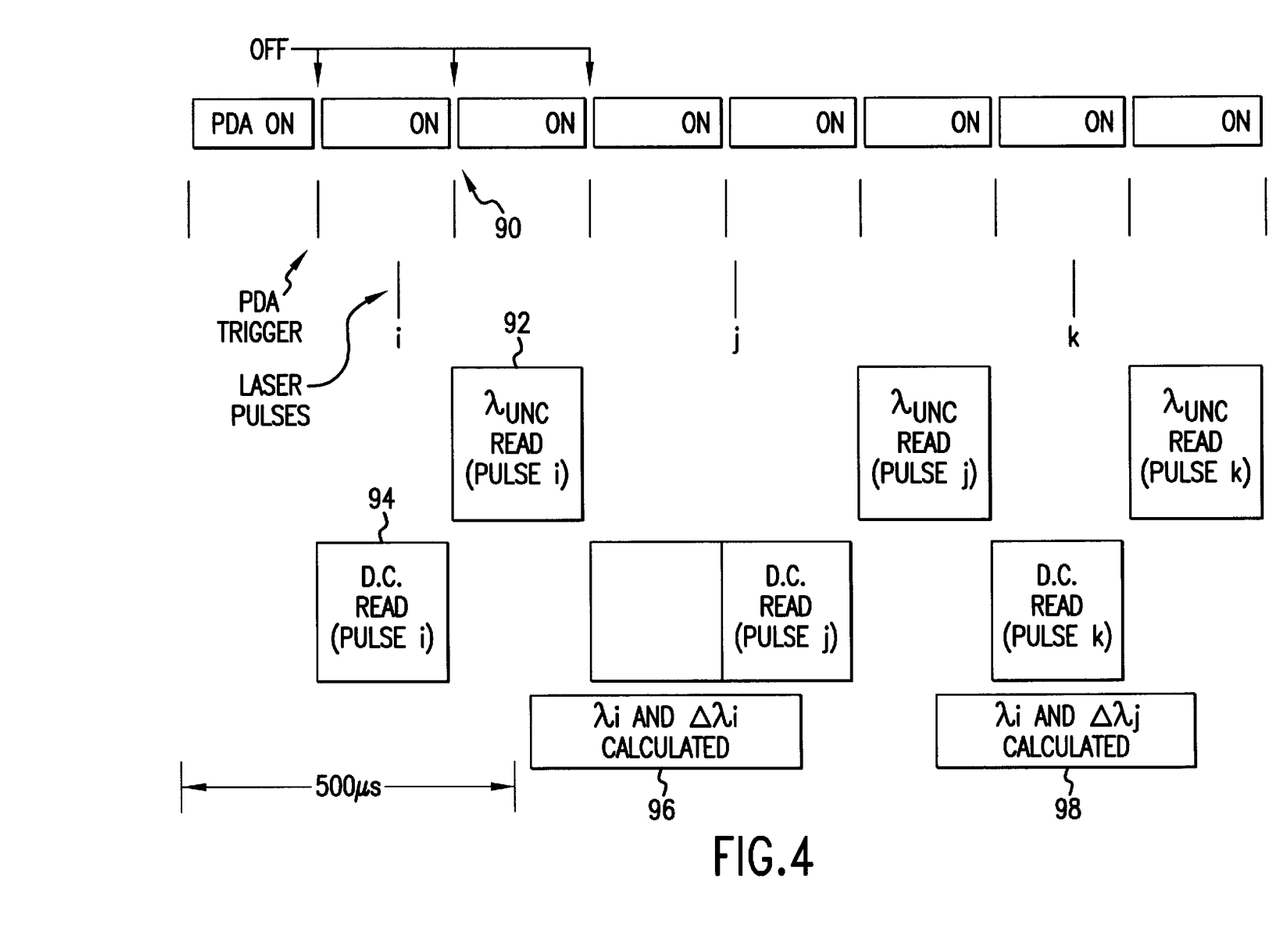
FIG. 4 shows a waveform diagram for dynamic dark current correction.

FIG. 4 shows the timing consideration associated with this particular embodiment. The PDA is operated as described above on a 5000 Hz repetition rate. The laser is pulsing at 2,000 Hz. Three pulses are shown labeled pulses i, j and k. FIG. 4 shows eight PDA "ON" periods. The uncorrected i-pulse spectrum data in read to the PDA buffer during the "OFF" period shown at 90 and the data is read by PDA read circuit 50 during a 200 $\mu$s period as shown at 92. The dark current had previously been read by read circuit 50 as shown in FIG. 3 during the previous 200 $\mu$s as shown at 94 in FIG. 4. Processor 52 as shown in FIG. 3 uses these two sets of data to calculate wavelength $\lambda_i$ for pulse i and bandwidth $\Delta\lambda_i$ (both FWHM and 95% integral) for pulse i as shown at 96 as shown in FIG. 4. A similar technique is followed for calculating wavelength and bandwidth for pulse j as shown at 98.

As shown in FIG. 4, the wavelength and bandwidth calculations of pulse i are completed a few microseconds after the occurrence of pulse j; therefore, the results from pulse i could not be used to precorrect pulse j but can be used to precorrect pulse k. In a preferred embodiment, the wavelength data is used in a feedback arrangement to correct the wavelength of pulses occurring about 1 ms after the occurrence of the measured pulse. By reducing the number of pixels read to one-half, the total measurements and calculations could be made fast enough to correct the next pulse at pulses of 2,000 Hz.

Figure 6A:
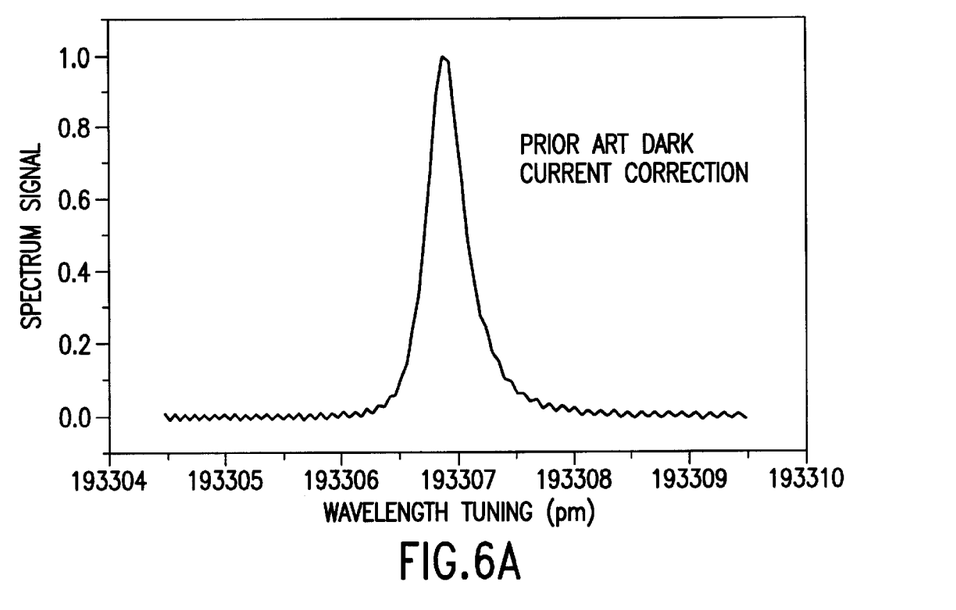
FIG. 6 shows laser spectrums measured with dynamic dark current correction technique of the present invention as compared to prior art dark current correction technique.
Figure 6B:
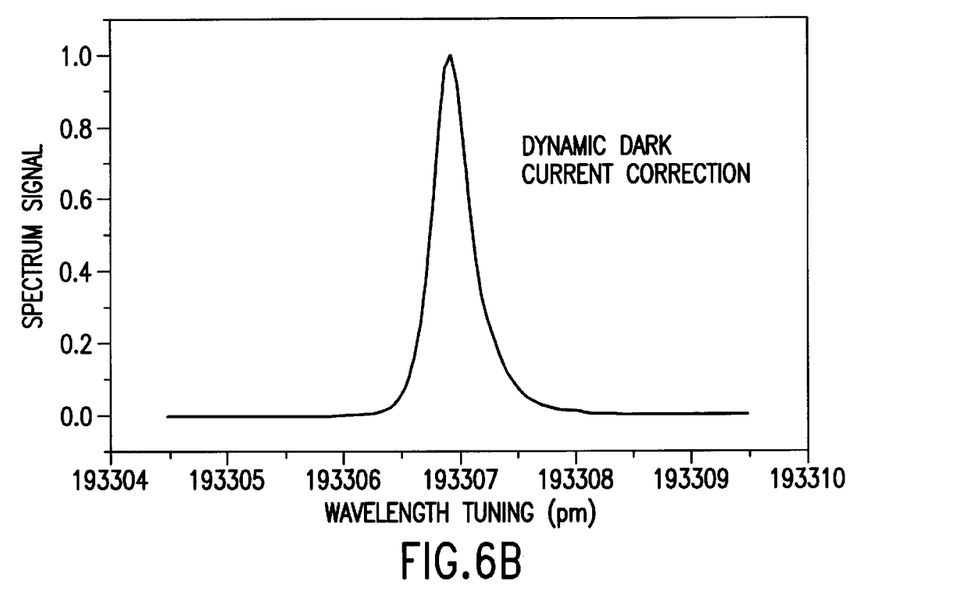

FIG. 6 compares an ArF excimer laser spectrum measured with dynamic dark current correction of the present invention to a prior art averaged dark current correction. Dynamic dark current correction of the present invention does correction individually for every pixel, while prior art averaged dark current correction use single dark current value for all PDA pixels. This single value is an average signal from several unexposed pixels in the PDA.

Figure 7:
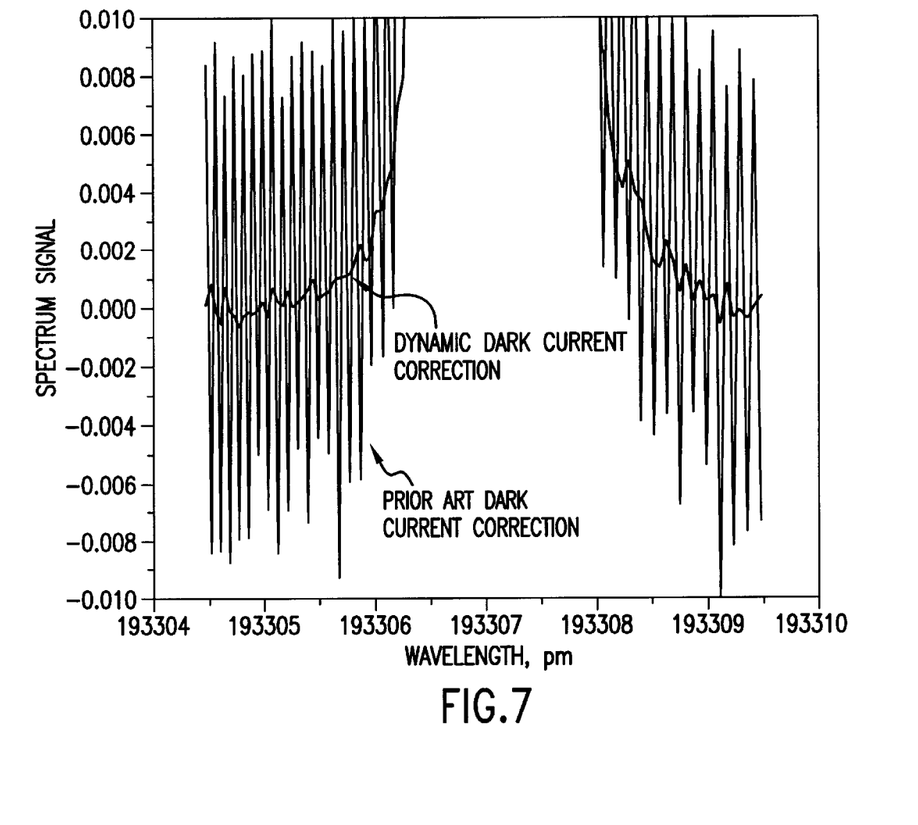
FIG. 7 shows zoomed portion of the laser spectrum measured with dynamic dark current correction technique of the present invention as compared to prior art dark current correction technique.

FIG. 7 compares a 100x zoomed spectrum measured with prior art averaged dark current correction and the corresponding dynamic dark current correction of the present invention. (What appears to be oscillations in the prior art data is a result of a special design feature of this, and other, fast PDA's to achieve faster readout. Odd pixels are read out with a first electronic circuit and even pixels are read out in parallel with a second electronic circuit. The read out circuits are not exactly the same producing the apparent oscillations at the "noise" level.) The benefits of the dynamic dark current correction are clear.

Fast Calculation of Wavelength

The spectrometer preferably measures wavelength and bandwidth substantially in real time. Because the laser repetition rate may be 2 kHz or higher, it is necessary to use algorithms which are accurate but not computationally intensive in order to achieve the desired performance with economical and compact processing electronics.

Figure 12A:
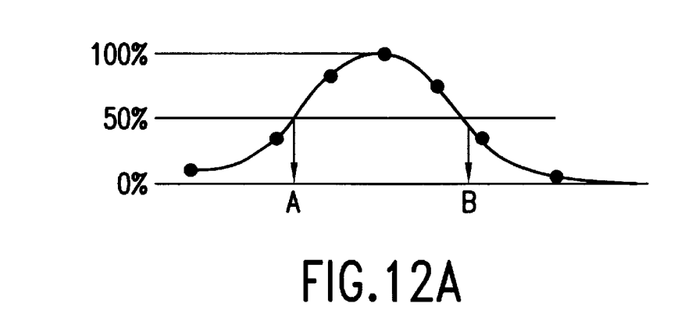
FIGS. 12A and 12B show how wavelength and bandwidth are calculated.
Figure 12B:
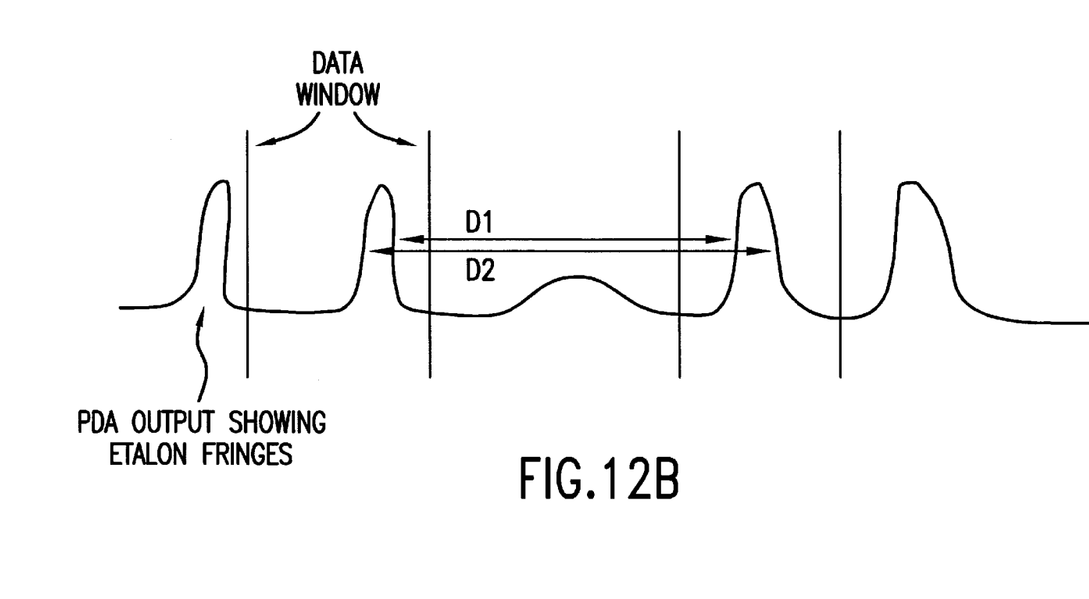

The specific details of a preferred algorithm used in this preferred embodiment will now be described. FIG. 12B is a curve with 5 peaks as shown which represents a typical etalon fringe signal as measured by linear photo diode array 50. The central peak is drawn lower in height than the others. As different wavelengths of light enter the etalon, the central peak will rise and fall, sometimes going to zero. This aspect renders the central peak unsuitable for the wavelength measurements. The other peaks will move toward or away from the central peak in response to changes in wavelength, so the position of these peaks determines the wavelength, while their width measures the bandwidth of the laser. A region labeled "data window" is shown in FIG. 12B. The data window is located so that the fringe nearest the central peak is normally used for the analysis. However, when the wavelength changes to move the fringe too close to the central peak (which will cause distortion and resulting errors), the second closest peak will be inside the data window, and the software will jump to that peak. Conversely, when the wavelength shifts to move the current peak outside the data window away from the central peak the software will jump to an inner fringe within the data window.

The steps involved are as follows:
1. After a laser pulse, the photo diode array output is electronically read out, digitized and corrected as described above. Data points are separated by an interval physically determined by the spacing of the photo diode array elements, in this case 25 micrometer pitch.
2. The digital data is searched to find the peak intensity value in the data window. The previous peak location is used as a starting point. Small regions are searched left and right of the starting point. The search region is extended by small intervals left and right until a peak is found. If the peak is outside the data window, the search will automatically continue until the other peak is found.

3. Based on the intensity of the peak, a 50% level is computed as shown in FIG. 12A The 0% level is measured periodically between the pulses. Based on the computed 50% level, points are examined right and left of the peak until the data points which border the 50% level are found. A linear interpolation is computed between pairs of points, which border the 50% level to find the left and right half-maximum positions, labeled A, and B in FIG. 12A.

4. Steps 2 and 3 are duplicated for the two data windows, giving a total of four interpolated 50% positions. As indicated FIG. 12B, two diameters are computed. D1 is the inner fringe diameter while D2 is the outer fringe diameter.

Fine Wavelength Calculation

The inner and outer fringe diameters D1 and D2 (in units of pixels) are each converted to wavelength by the following equations:

$$\lambda = \lambda_0 + Cd(D O^2 - D_0^2) + N \cdot FSR$$

where $\lambda$=wavelength corresponding to diameter D $\lambda_0$=calibration wavelength $D_0$=diameter corresponding to wavelength $\lambda_0$ Cd=calibration constant dependant on the optical design FSR=free spectral range of the etalon N=integer, =0, ±1, ±2, ±3 . . .

The values $\lambda_0$, $K_1$, FSR, and $D_0$ are determined and stored at the time of calibration.

The value for N is chosen such that:

$$|\lambda - \lambda_c| \leq \tfrac{1}{2} FSR$$

where $\lambda_c$=coarse wavelength determination.

For example, in a preferred embodiment, we select a reference wavelength $\lambda_0$=248,327.1 pm (corresponding to an absorption line of an iron hollow cathode lamp). At this wavelength, the fringe diameter Do might be found to be 300 pixels. Cd is a constant which can either be directly measured or calculated from the optical design.

In our preferred embodiment, Cd=$-9.25 \times 10^{-5}$ pm/pixel$^2$. Thus, for example, with the laser operating at a different wavelength, the fringe diameter may be measured to be 405 pixels. The possible wavelengths computed by equation (1) are:

$$\lambda = 248{,}327.1\ pm - 9.25 \times 10^{-5}\ pm/pixel^2[(405)^2 - (300)] +$$
$$N \cdot FSR$$
$$= 248{,}333{,}95 + N \cdot FSR$$

If the free spectral range FSR=20 pm, then the possible values for $\lambda$ include:

248,293.95 pm N=−2
248,313.95 pm N=−1
248,333.95 pm N=0
248,353.95 pm N=+1
248,373.95 pm N=+2

If the coarse wavelength is measured to be $\lambda_c$=248,350, for example, then the processor will select the value $\lambda$=248,353.95 pm (N=+1) as the solution in the closest agreement with $\lambda_c$.

The inner and outer fringe diameters $D_1$ and $D_2$ as shown in FIG. 16B are each converted into wavelengths $\lambda_1$ and $\lambda_2$, respectively. The final value which is reported for the laser wavelength is the average of these two calculations:

$$\lambda = \left(\frac{\lambda_1 + \lambda_2}{2}\right)$$

Bandwidth Calculation

Full Width Half Maximum ($\Delta\lambda_{FWHM}$)

The full width half maximum bandwidth of the laser is computed as $(\lambda_2 - \lambda_1)/2$. This bandwidth is slightly larger than the real bandwidth of the laser because it is broadened by an etalon spectrometer slit function shown in FIG. 5. There are several ways known in the prior art to determine the true value of the bandwidth. For example, one method is to use mathematical operation of deconvolution of the measured bandwidth to extract the true bandwidth value. Another, more simple method is to subtract a fixed correction $\Delta\lambda$E factor. Because the etalon spectrometer of the present invention is a very accurate instrument, this laser method might provide sufficient accuracy. Therefore, the bandwidth is:

$$\Delta\lambda = \frac{\lambda_2 - \lambda_1}{2} - \Delta\lambda E$$

$\Delta\lambda$E depends on etalon specifications and can be in the range of 0.05÷1 pm for applications described here.

Calculation of 95% Integral

Calculations of the 95% integral ($\Delta o_{I95}$) are more computation intensive. For that an integral energy function $I(x_i)$ is calculated using formula:

$$I(x_j) = \sum_{i=N_1}^{i=j} f(x_i) \cdot \lambda(x_i),$$

where i and j refer to pixel numbers $N_1$ to $N_2$, $N_1$ and $N_2$ being respectively the smallest and largest pixel numbers used for $\Delta\lambda_{95}\%$ calculations.

$x_i$ and $x_j$ are pixel numbers, $f(x_i)$ is the signal registered from pixel $x_i$ $\lambda(x_i)$ is the wavelength corresponding to pixel $x_j$ $I(x_j)$ is the signal integral function.

After that function $I(x_i)$ is normalized to its value at last pixel number $N_2$.

$$I_n(x_i) = \frac{I(x_i)}{I(x_{N_2})}$$

Then two points $x_l$ and $x_r$ (representing the left and right sides of the distribution) are determined from the following equations:

$I_n(X_l)$=0.025 and
$I_n(X_r)$=0.975.

Finally, the $\Delta\lambda_{I95}\%$ can be calculated as $\Delta\lambda_{I95}\%=\lambda(x_r)-\lambda(x_l)$. Again, for increased accuracy, function $f(x_i)$ can be deconvolved before doing $\Delta\lambda_{I95}$ calculations.

Other Embodiments

Figure 8:
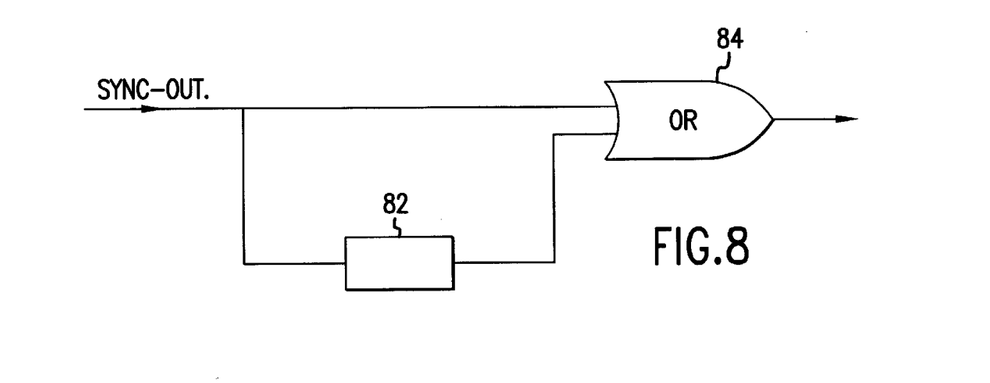
FIG. 8 shows a PDA trigger circuit for the second embodiment of the present invention.
Figure 9:
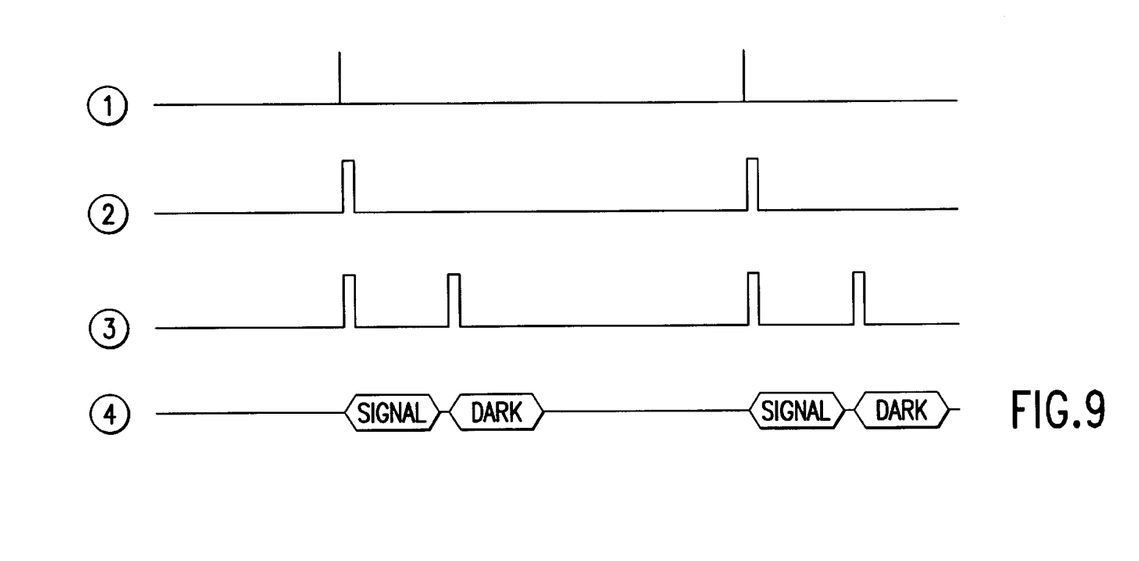
FIG. 9 shows timing diagram for the second embodiment of the present invention.

A second embodiment of the present invention is shown in FIGS. 8 and 9. As shown in FIG. 8, the SYNC-OUT signal from the laser is used as an input trigger for the PDA trigger circuit. This SYNC-OUT signal is generated by a laser shortly after the laser pulse. Typically, the delay of SYNC-OUT can be 10 to 50 $\mu$s after the laser pulse. The time delay circuit 82 is used to delay SYNC-OUT by the time necessary for one PDA scan, which can be about 200 $\mu$s for 5 kHz line scan rate. Then, delayed and direct SYNC-OUT pulses are ORED together in circuit 84. As a result, two trigger signals are produced: one shortly after the laser pulse has been fired, and one PDA line scan after that. As a result, PDA scans two times per each laser pulse. The first PDA scan will have spectrum signal and the second pulse will have dark current correction signal. Then the dark current correction data are subtracted from the spectrum data by microprocessor 52 (FIG. 3) just as in the first embodiment of the present invention. FIG. 9 shows typical waveforms in this case. Waveform 1 is a laser light pulse, which is very short, typically about 20 ns. Waveform 2 is a laser SYNC-OUT pulse. Waveform 3 shows the SYNC-OUT and delayed SYNC-OUT pulses generated by circuit 84. Waveform 4 shows signal and dark current PDA scans.

Figure 10:
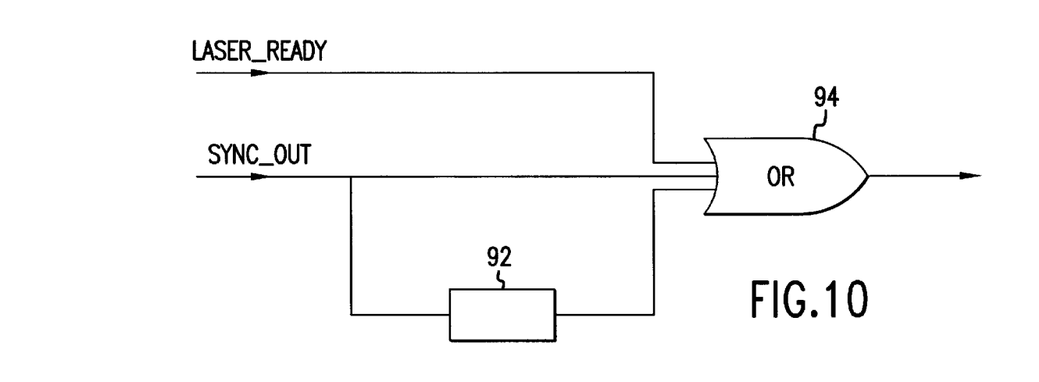
FIG. 10 shows a PDA trigger circuit for the third embodiment of the present invention.
Figure 11:
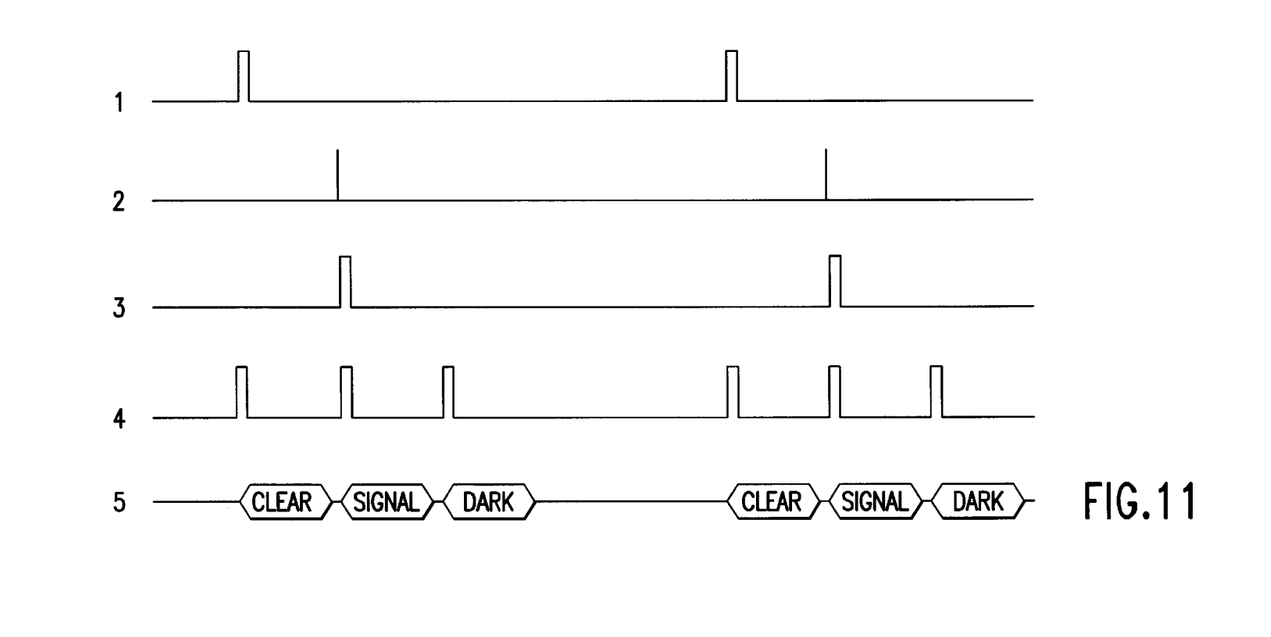
FIG. 11 shows timing diagram for the third embodiment of the present invention.

A third embodiment of the present invention is shown in FIGS. 10 and 11. In this embodiment, two pulses from the laser are used. The first pulse called LASER-READY is generated about 200 $\mu$s before the actual laser light pulse. This pulse, for example, can be generated by the laser when it starts to charge its capacitors for the next pulse. The second pulse called SYNC-OUT comes right after the light has been produced. This pulse is delayed by about 200 $\mu$s in a delay circuit 92. All three pulses are combined in OR circuit 94. As a result, there are three PDA scans for each laser light pulse. The first scan, which is done before the laser pulse, is used to clear the PDA from any background it might accumulate since the previous laser light pulse. This might be useful especially when laser repetition rate is low, therefore, the time interval between the pulses is large. The second pulse is used to scan the laser spectrum, and the third pulse is used to scan the dark current data.

FIG. 11 shows corresponding waveforms. Waveform 1 is LASER-READY pulse. Waveform 2 shows actual laser light pulse. Waveform 3 shows laser SYNC-OUT pulse. Waveform 4 shows three PDA scan trigger pulses, and waveform 5 shows three PDA scans per each laser pulse.

The persons skilled in the art will recognize, that instead of scanning PDA in order to clear it, some PDA have a special input such that when a high level for low level depending on particular PDA design, is sent to that input, all previously collected signal will be erased from every PDA element. However, author of the present invention has observed that using this feature does not guarantee reliable erase of all the PDA elements down to $10^{-3}$ level, which is required for $\Delta\lambda_{95}\%$ measurements. Therefore, the third embodiment of the present invention will offer more complete erasure of PDA elements and will allow more accurate spectral measurements.

Preferred Uses

The present invention may be incorporated into lithography lasers of the type described in U.S. Pat. No. 5,991,324, in which the double pass etalon could replace the etalon 84 shown in FIG. 10 of that patent. In this case, a separate PDA would preferably be provided for the coarse wavelength measurement made using grating 76 shown in FIG. 10 of U.S. Pat. No. 5,991,324. Another important use of the present invention is as a portable spectrometer tool which could be carried to and used for periodic beam quality measurements on many lithography lasers. The spectrometer system described above is compact enough to fit in a portable suitcase size case. When doing so, preferably the beam between lens 42 and PDA 44 would be folded at least once, maybe twice, using folding mirrors as was done in the wavemeter shown in FIG. 10 of U.S. Pat. No. 5,991,324.

Various modifications may be made to the invention without altering its scope. All of the above are just examples of the present invention. Those skilled in the art will readily recognize that numerous other modifications and alterations may be made without departing from the spirit and scope of the invention. Preferably one set of noise data is measured for each set of pulse data and the noise data is used to correct the pulse data. However, other variations of this one for one technique could be used. For example, one set of noise data could be used to correct several (such as 10) sets of pulse data Since there is normally substantial randomness in noise data, there could be advantages in using a running average of several (such as 10) sets of noise data to correct each set of pulse data. This approach would be useful if experiments showed that random variations in the noise was greater than the temporal variation in this noise. Accordingly, the above disclosure is not intended to be limiting and the scope of the invention is to be determined by the appended claims.

I claim:

1. A laser spectrometer for making spectral measurements of laser light from a high repetition rate pulse laser at rates of at least 1000 measurements per second, said spectrometer comprising:

A) a double pass etalon device;
   B) a fast photodetector array;
   C) a process device configured to:
   1) process pulse information collected by said fast photodetector array during time intervals when said laser is lasing, said pulse information collected during each such interval defining a set of pulse information,
   2) processing noise information collected by said fast photodetector during time intervals when said laser is not lasing said noise information collected during each such interval defining a set of noise information,
   3) using at least some of said set of pulse information and said sets of noise information, calculating spectral qualities of said laser light at rates at least 1000 calculations per second.

2. A spectrometer as in claim 1 wherein said spectral qualities include values of 95 percent integral bandwidth.

3. A spectrometer as in claim 1 wherein said spectral qualities include values of full width half maximum.

4. A spectrometer as in claim 1 wherein said spectral qualities include values of center-line wavelength.

5. A spectrometer as in claim 1 wherein said spectral qualities include values of full width half maximum, values of 95 percent integral and values of center-line wavelength.

6. A spectrometer as in claim 1 wherein said spectrometer is an integral part of said high repetition rate pulse laser.

7. A spectrometer as in claim 1 wherein said spectrometer is contained in a portable carrying case.

8. A spectrometer as in claim 1 wherein said double pass etalon device comprises a retroreflector.

9. A spectrometer as in claim 8 wherein said double pass etalon device comprises a beam reduction telescope and a diffuser.

10. A spectrometer as in claim 1 wherein said photodetector array is a photodiode array.

11. A spectrometer as in claim 10 wherein said fast diode array comprises at least about 1024 pixels.

12. A spectrometer as in claim 11 wherein said photodiode array comprises about 2048 pixels.

13. A spectrometer as in claim 1 wherein said processor device comprises a read out circuit and a digital processor.

14. A spectrometer as in claim 1 wherein said spectrometer is configured to collect at least one set of noise information for each set of pulse information.

15. A spectrometer as in claim 14 wherein one set of said at least one set of noise information is used to correct a set of pulse information collected during an immediately succeeding or preceding time interval.

16. A spectrometer as in claim 14 wherein said processor is configured to correct said pulse information using sets of noise information comprising averae values of several sets of noise information.

* * * * *